(12) United States Patent
Jourdan

(10) Patent No.: US 8,677,642 B2
(45) Date of Patent: Mar. 25, 2014

(54) THREE-DIMENSIONAL MEASUREMENT DEVICE

(75) Inventor: Stephane Jourdan, Saint-prim (FR)

(73) Assignee: Celette France, Vienne (FR)

( * ) Notice: Subject to any disclaimer, the term of this patent is extended or adjusted under 35 U.S.C. 154(b) by 201 days.

(21) Appl. No.: 13/321,394

(22) PCT Filed: May 17, 2010

(86) PCT No.: PCT/EP2010/056742
§ 371 (c)(1),
(2), (4) Date: Feb. 14, 2012

(87) PCT Pub. No.: WO2010/133552
PCT Pub. Date: Nov. 25, 2010

(65) Prior Publication Data
US 2012/0131806 A1    May 31, 2012

(30) Foreign Application Priority Data

May 19, 2009    (FR) .................................... 09 02420

(51) Int. Cl.
*G01B 5/008* (2006.01)
(52) U.S. Cl.
USPC .......................................... 33/503; 33/1 MP
(58) Field of Classification Search
USPC ......................................... 33/1 MP, 503, 556
See application file for complete search history.

(56) References Cited

U.S. PATENT DOCUMENTS

| | | | |
|---|---|---|---|
| 5,758,429 A * | 6/1998 | Farzan et al. | 33/503 |
| 6,125,337 A | 9/2000 | Rosenberg et al. | |
| 2002/0029485 A1 | 3/2002 | Pettersson | |
| 2008/0235970 A1 * | 10/2008 | Crampton | 33/503 |
| 2008/0271332 A1 * | 11/2008 | Jordil et al. | 33/503 |
| 2008/0295349 A1 * | 12/2008 | Uhl et al. | 33/503 |
| 2009/0177435 A1 | 7/2009 | Heininen | |
| 2010/0058602 A1 * | 3/2010 | McMurtry | 33/503 |
| 2012/0317826 A1 * | 12/2012 | Jonas | 33/503 |
| 2013/0185948 A1 * | 7/2013 | Racine | 33/503 |

FOREIGN PATENT DOCUMENTS

EP    1 286 130 A1    2/2003

* cited by examiner

*Primary Examiner* — G. Bradley Bennett
(74) *Attorney, Agent, or Firm* — Sughrue Mion, PLLC

(57) ABSTRACT

The invention concerns a three-dimensional measuring device, which comprises:
- a base (5) intended to be fixed to a support assembly (6) and lying in a first plane,
- a plate (14) mounted so as to rotate on the base (5) about a first axis (Z), said plate being equipped with a first sensor (c1) determining the angle of rotation (Φ) of the plate about this first axis (Z),
- a single rocking telescopic arm (2), a first end of which is articulated on the plate (14) about a second axis (X) orthogonal to the first axis (Z), the angle of rotation (θ) of said arm about the second axis (X) being determined by a second sensor (c2), the second end of the single telescopic arm being provided with a measuring feeler (3), and the said single arm being equipped with a third sensor (c3) determining the elongation length (ρ) of the arm in translation, so that the spatial position of the measuring feeler is determined by its polar coordinates (ρ, θ, Φ) in the fixed three-dimensional reference frame consisting of the base (5) once the latter is fixed to the support assembly (6).

17 Claims, 4 Drawing Sheets

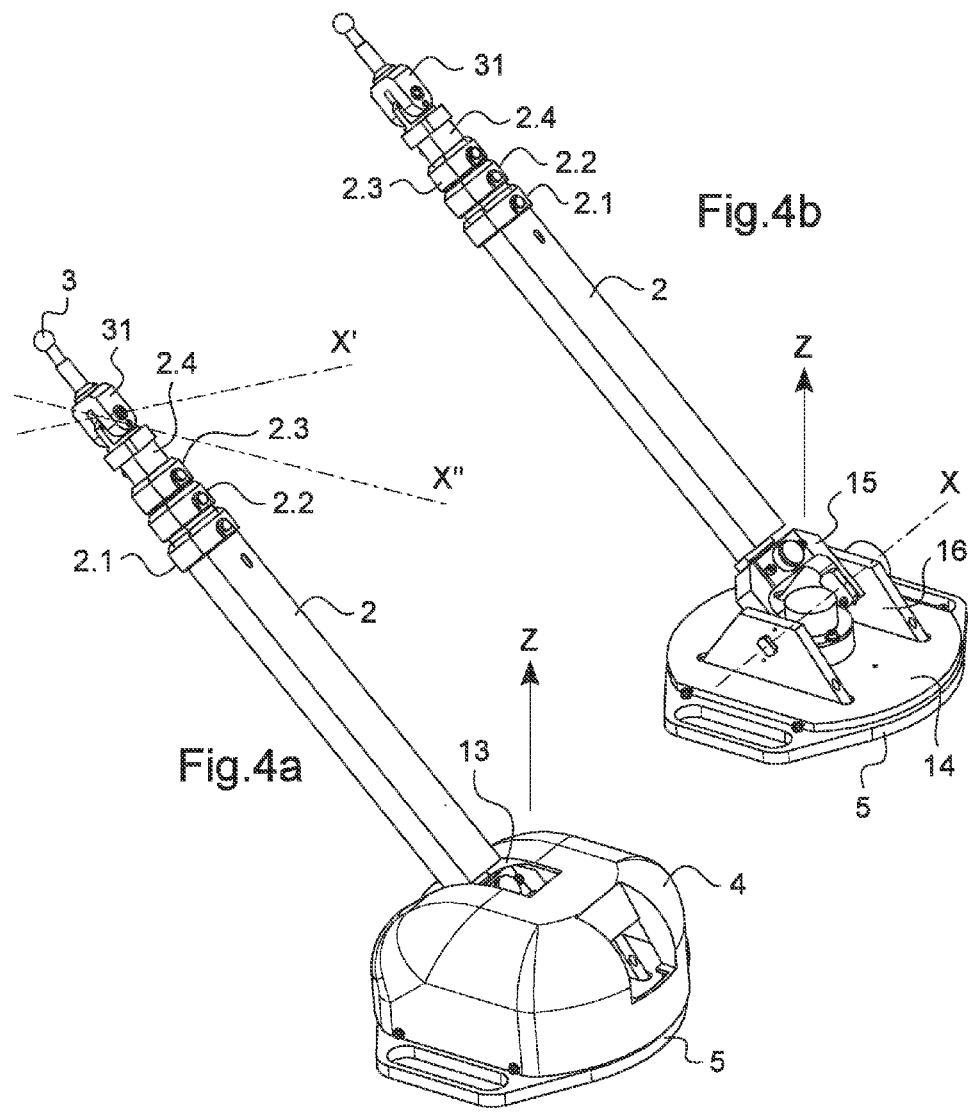
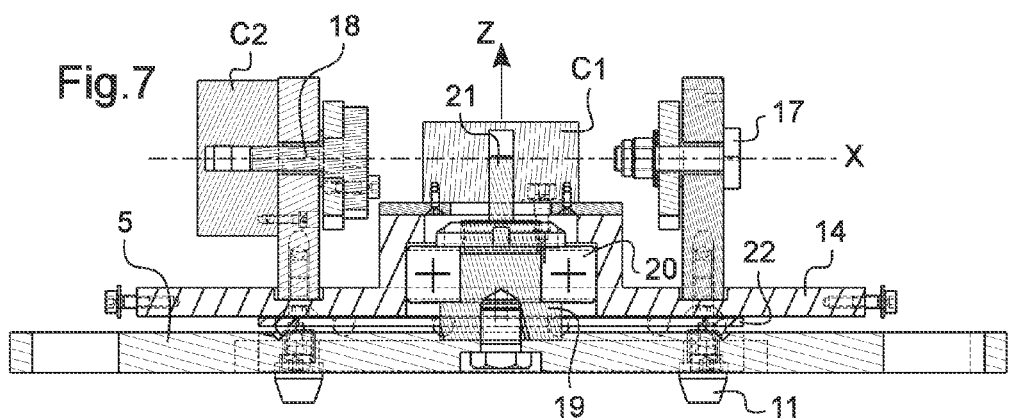

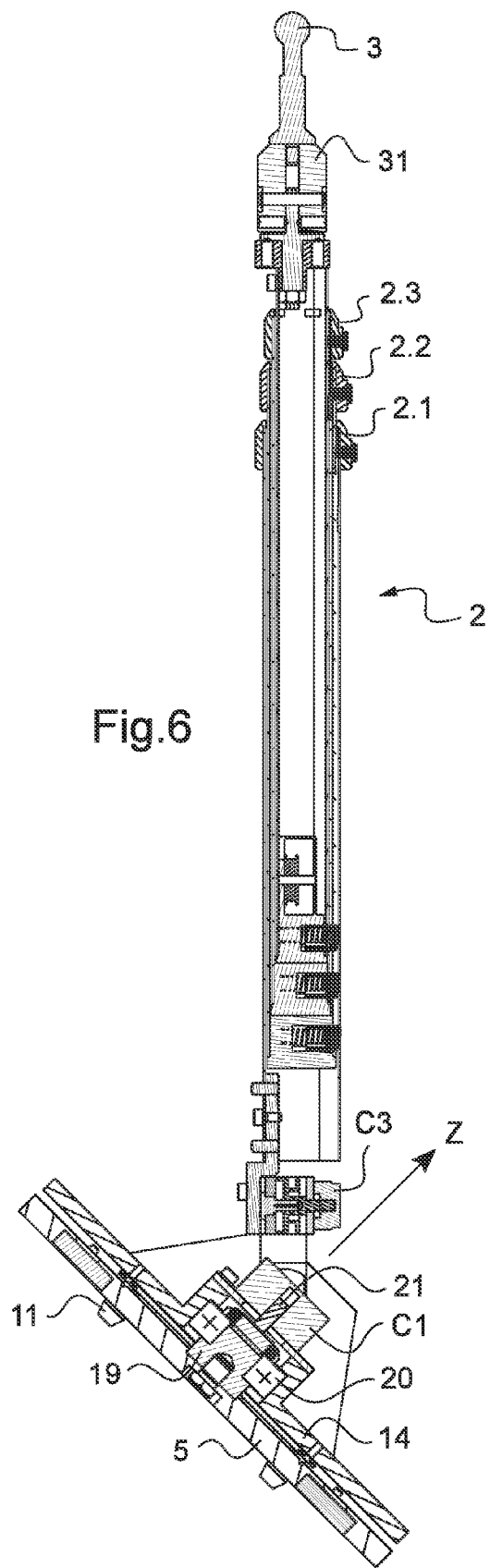

THREE-DIMENSIONAL MEASUREMENT DEVICE

CROSS REFERENCE TO RELATED APPLICATIONS

This application is a National Stage of International Application No. PCT/EP2010/056742, filed on May 17, 2010, which claims priority from French Patent Application No. 0902420, filed on May 19, 2009, the contents of all of which are incorporated herein by reference in their entirety.

FIELD OF THE INVENTION

The present invention concerns a three-dimensional measuring device.

BACKGROUND OF THE INVENTION

Numerous three-dimensional measuring devices exist in varied fields of use. By way of non-limitative illustration, the invention will concern more particularly the use of this type of measuring device for checking deformations in a damaged vehicle body.

A first known type of three-dimensional measuring device uses a plurality of articulated arms that each comprise angular sensors integrated so as to determine the rotation angles of the arms about each of their articulation axes provided. A measuring device of this type is thus known from the document WO 2006/111630-A1, comprising several articulation arms in the form of hollow tubes interposed between two sections, one of which receives an angular sensor, each hollow tube having an abutment configuration complementary to those of the ends of the adjacent arm sections. This articulated arm design is advantageous since it is modular. However, it requires, in order to make the measurement, at least two arms articulated on each other, which makes the manufacture and use of the device relatively complex, and makes the device relatively bulky and expensive.

The document WO-2007/101 905 A1 descries another device with several articulated arms.

Reference can also be made, for multi-arm devices, to the documents US-2002/0029485 A1, U.S. Pat. No. 6,125,337 A and EP-1 286 130 A1.

Measuring devices using telescopic rods are also known. For example the measuring device described in the document FR-A-2 909 765 A1 of the applicant comprises telescopic means comprising a piston rod sliding vertically in an associated column, a column supported by beams of a inspection bench and referenced with respect to the latter by means of appropriate piercings on which the column is fixed. The piston rod is chosen from a plurality of piston rods of different axial lengths. This solution is also advantageous since the piston rod is interchangeable according to the relative height of the points of the body to be measured with respect to the inspection bench. However, it requires frequent manipulation of the device in order to mount and demount the piston rods according in particular to the type of vehicle to be checked.

OBJECT OF THE INVENTION

The object of the invention is to propose a three-dimensional measuring device the design of which aims to minimise the aforementioned drawbacks. It thus relates to a measuring device that is of simpler design and use, while being compact.

GENERAL DEFINITION OF THE INVENTION

The aforementioned problem is solved in accordance with the invention by a three-dimensional measuring device with an articulated arm provided with at least one sensor, the device comprising:
a base intended to be fixed to a support assembly and lying in a first plane,
a plate mounted so as to rotate on the base about a first axis orthogonal to this first plane, said plate being equipped with a first sensor determining the angle of rotation of the plate about this first axis,
a single rocking telescopic arm, a first end of which is articulated on the plate about a second axis orthogonal to the first axis so as to be able to rock in a second plane containing the first axis and orthogonal to the second axis, the angle of rotation of said single arm about the second axis being determined by a second sensor, the second end of the single telescopic arm being provided with a measuring feeler, the said single arm being equipped with a third sensor determining the elongation length of the arm in translation, the spatial position of the measuring feeler being determined by its polar coordinates in the fixed three-dimensional reference frame consisting of the base once the latter is fixed to the support assembly.

The device according to the invention, in order to have the three-dimensional coordinates of a point, therefore combines two rotation movements, that of the plate rotating in respect to the fixed base of the device on the one hand and that of the telescopic arm with respect to the rotating plate on the other hand, with a translation movement, that of the arm the end of which can move axially depending on whether the arm is in a completely retracted position, in the intermediate position or in a completely deployed position.

In fact, the measuring feeler equipping the end of the single telescopic arm can move in a volume delimited by two concentric hemispheres corresponding respectively to the minimum extension (corresponding to the completely retracted position) of the said single telescopic arm and the maximum elongation (corresponding to the completely deployed position) of the said single telescopic arm.

The device according to the invention allows three-dimensional measurements with remarkable economy of means and saving in space: this is because it uses only a single articulated arm. In addition, because of its very compactness, it is easy to move on the support assembly and, depending on the length of the travel chosen for the telescopic rod, it can adapt to the measurement of points situated at distances, in particular heights, that are very variable with respect to the support assembly: in an application aimed at measurement apparatus on damaged vehicle inspection benches, the measuring device according to the invention adapts to numerous vehicle configurations.

Other features and advantages of the invention will emerge more clearly in the light of the following description and the accompanying drawings, concerning a particular embodiment.

BRIEF DESCRIPTION OF THE DRAWINGS

Reference will be made to the figures of the accompanying drawings, where:

FIGS. 4a-4b are more detailed perspective views of the measuring device according to FIG. 1, with (FIG. 4a) and without (FIG. 4b) a protective cover;

FIG. 6 is a view in section of the device according to FIG. 4b;

FIG. 7 shows a detail of the view according to FIG. 6, showing the base, the rotating plate and the bottom end of the single telescopic arm.

All the figures are schematic and are not necessarily to scale in order to facilitate reading thereof, each element shown keeping the same reference in all the figures.

DETAILED DESCRIPTION OF A PREFERRED EMBODIMENT

Figure 1:
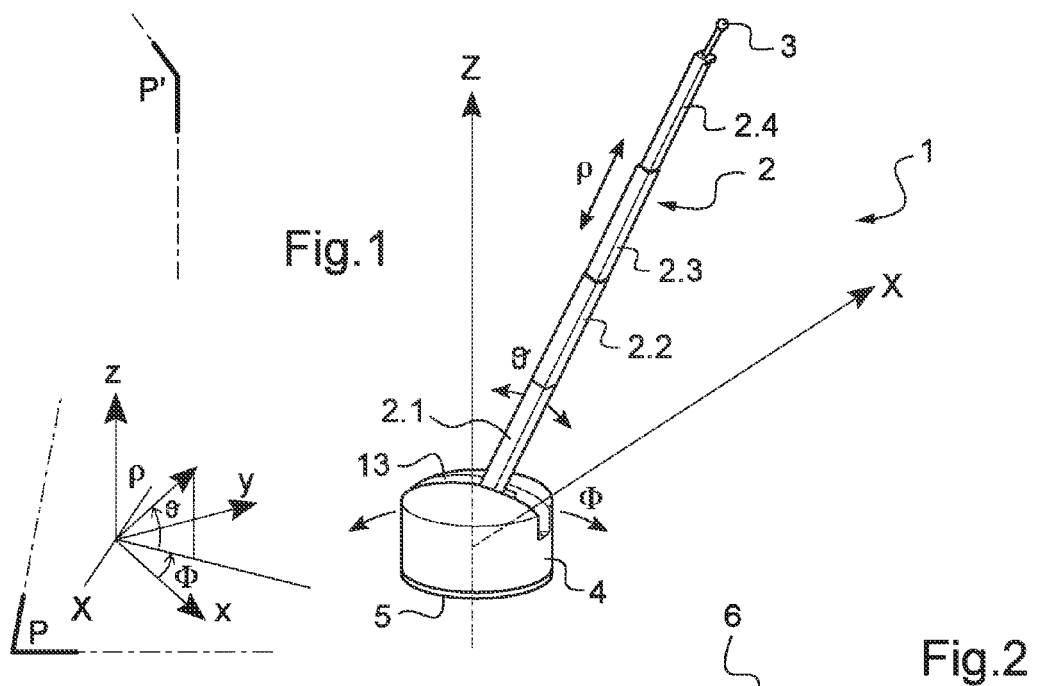
FIG. 1 is a schematic perspective view of an example embodiment of a three-dimensional measuring device according to the invention for viewing the various translation and rotation movements of its components.

FIG. 1 shows schematically the measuring device 1 according to the invention intended to be mounted on an inspection bench in order to measure the position of points on components of a vehicle.

The device is shown in FIG. 1 as disposed once mounted on the inspection bench.

This device comprises a single telescopic arm 2 mounted by its bottom end on a rotation plate, not visible in this figure since it is disposed under a protective cover 4, this rotating plate being itself mounted on a base 5 intended to be fixed to the inspection bench (elements detailed by means of the following figures).

The single telescopic arm 2 is provided at its top end with a feeler 3 and, in a known fashion, is composed of several hollow rods 2.1, 2.2, 2.3, 2.4, here for example with a rectangular cross section and sliding in one another. In this example they are four in number and are shown in their maximum deployed position. The feeler 3, in a known fashion, is in the form of a spherical head, here fixed to the arm 2 by means of a fork joint 31. In this example, the head 3 can pivot with respect to the arm 2 on two axes: it can pivot about the articulation axis X' of the fork joint 31 as shown in FIG. 4a. The mounting of the fork joint 31 on the arm 2 allowing pivoting of the fork joint 31 by a quarter of a turn by means of a ball screw system, not shown, the head 3 can also pivot about a second axis X" perpendicular to the axis X'.

In this example, the head 3 can adopt only a certain number of predetermined positions with respect to the axis X' and with respect to the axis X", indexed positions of which the operator informs the associated computer prior to the measurement by the three sensors $c_1$, $c_2$ and $c_3$, as described below. Alternatively, if it is wished for the head 3 to be able to adopt angular positions continuously in a given angular range, the head can then be equipped with a fourth angular sensor which will, in a known fashion, measure this position precisely (in a similar fashion to the angular measurements of the sensors $c_1$ and $c_2$ and as is known from the technology or articulated arms for example described in the aforementioned document WO 2006/000630 A1).

Alternatively, the head 3 may have an elongate shape or be in the form of a point.

Firstly, the rotating plate is mounted on the base 5 so as to be able to rotate with respect to the base about an axis Z by an angle Φ, in the plane P.

Secondly, the bottom end of the single arm 2 is articulated on the rotating plate so that the arm can pivot about an axis X orthogonal to the axis Z by an angle θ in a plane P' perpendicular to the plane P containing the base 5 and its rotating plate.

Finally, the top end of the single arm 2 is capable of extending by a length p varying between a minimum value where the arm is in a completely retracted position (as shown in FIGS. 4a, 4b) and a maximum value where the arm is in a completely deployed position (as shown in FIG. 1).

The feeler 3 can therefore be located in space in a fixed reference frame by its polar coordinates in a reference frame consisting of the base 5 once the latter is fixed to the inspection bench, for measurements of the angles Φ and θ and the elongation ρ.

Figure 2:
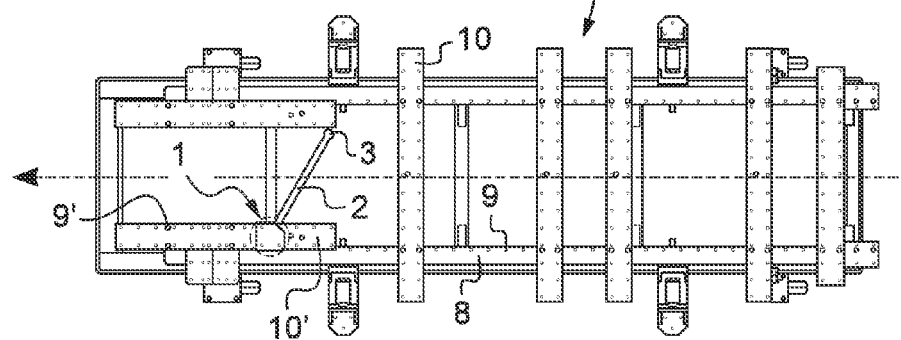
FIG. 2 is a plan view of the adjustment bench on which the measuring device according to FIG. 1 is intended to be mounted.
Figure 3:
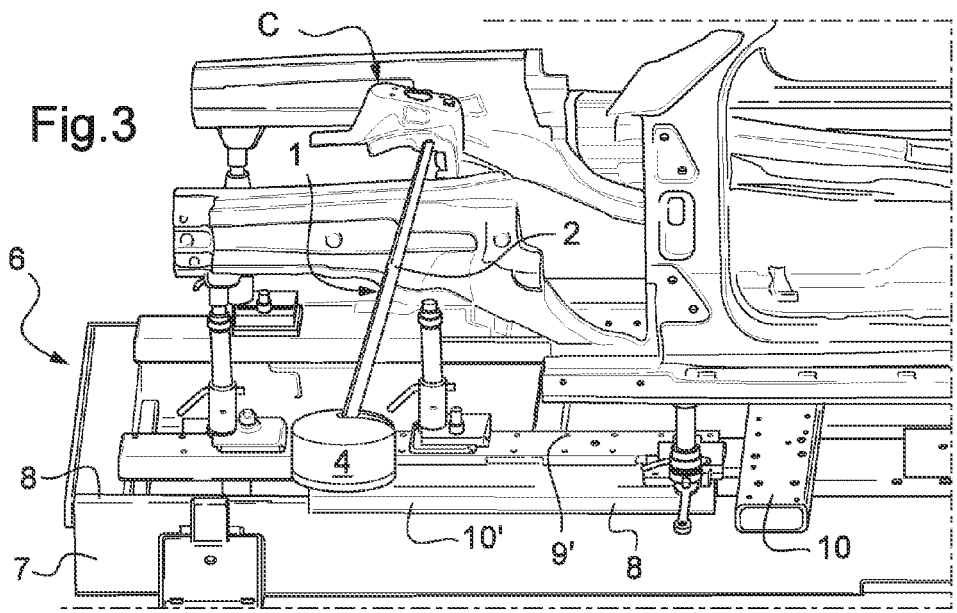
FIG. 3 is a perspective view of the three-dimensional measuring device according to FIG. 1 mounted on the adjustment bench (support assembly) according to FIG. 2.

FIG. 2 shows a support assembly, or inspection bench 6, on which the base 5 of the device 1 according to the invention is fixed. FIG. 3 is complementary to FIG. 2, showing in perspective the mounting of the device on this same bench. The bench 6 comprises a machine surface 8 itself pierced with holes 9 over its entire length, holes for positioning longitudinal bars 10 and transverse bars 10' by means of projecting elements provided on the bars and not shown. The transverse and longitudinal bars are themselves provided with holes 9' for centring the device 1 as described below.

The device 1 is associated with a chosen location of the support assembly 6 by centring means and holding means cooperating between said device 1 and said support assembly 6 in order to reference and hold the base of the device on its support assembly for each possible positioning of the base on the support assembly.

Figure 5:
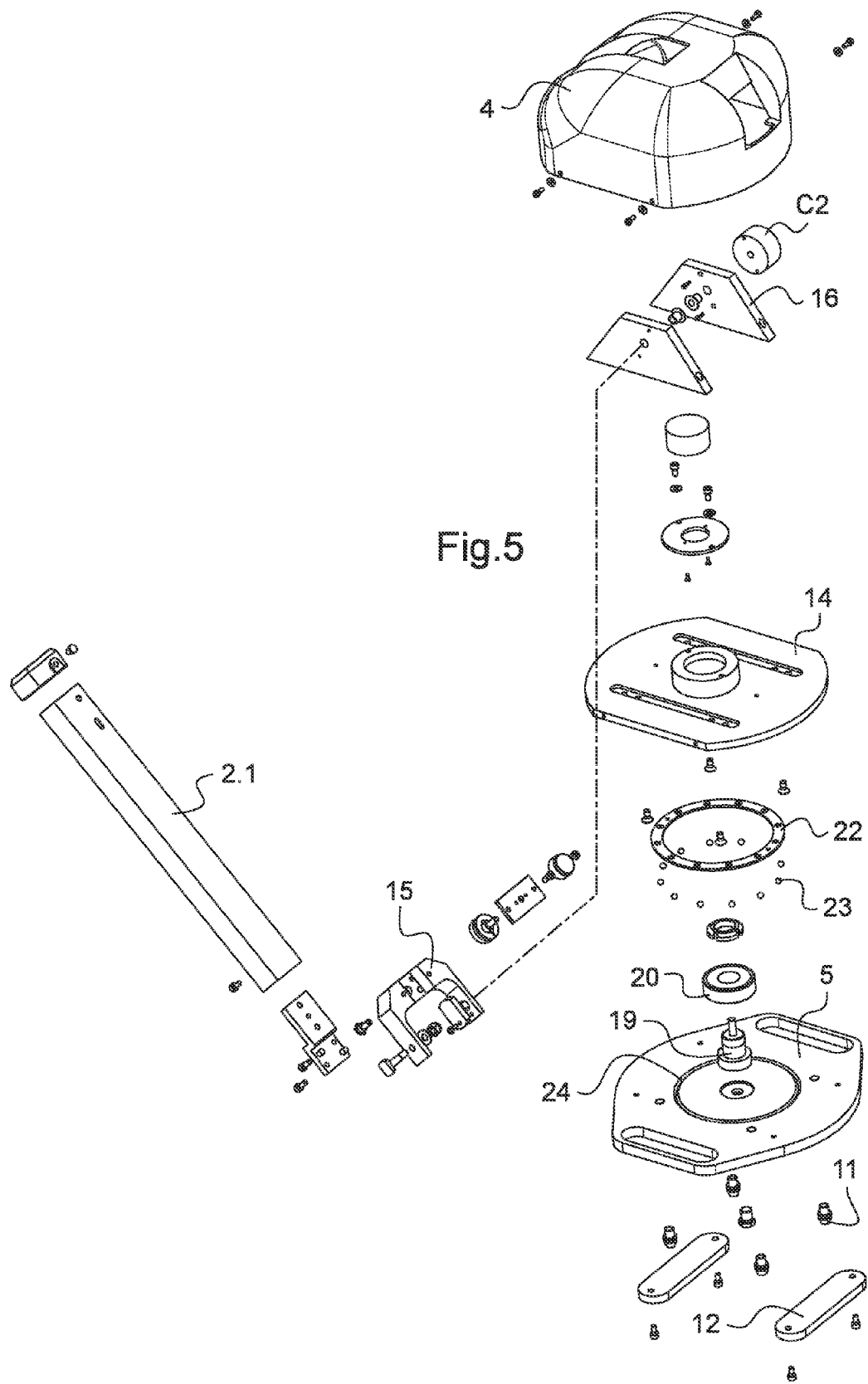
FIG. 5 is an exploded view of some of the components of the device according to FIGS. 4a-4b, which illustrates the method of mounting the plate on the base and the telescopic arm on the plate.

This is achieved, in this example embodiment, in the following fashion (illustrated both by FIG. 3 and by FIGS. 5, 6 and 7): the base 5 of the measuring device 1 can be moved along each bar 10 and 10'.

The base 5 is provided with means of centring vis-à-vis the support assembly comprising centring pins 11 able to cooperate with orifices 9' provided on the support assembly 6. In this example, the base 5 is provided with fixed centring pins 11 distributed over the bottom face thereof, here by way of example four in number. It can be positioned and referenced with respect to a longitudinal 10 or transverse 10' bar by inserting its four centring pins 11 in four of the orifices 9' of a bar 10' according to the chosen position.

The base 5 is also provided with means of holding on the support assembly 6, comprising magnets 12 able to cooperate with metal surfaces of the bars 10 and 10' provided on the support assembly 6. In this example, once the base 5 is positioned by its pins, it is held in place by means of magnets fixed by bolting to its bottom face, visible in FIG. 5 under the reference 12, to the bars 10 and 10' metal in nature.

FIG. 3 also shows a body portion C, disposed above the inspection bench, against which the measuring head 3 is manually arranged on a given point in order to take the measurement (a reference point that may be in the form of an orifice or a hollow facilitating the positioning of the spherical head of the feeler 3).

FIGS. 4a, 4b show views of the measuring device of the invention with and without protective cap, the single telescopic arm 2 being in the retracted position. The protective cover 4 according to FIG. 4a has a diametral slot 13 allowing rocking movement of the single arm 2, thus enabling it to pivot freely according to a predetermined angular amplitude. The cover 4 thus protects the elements for mounting and articulating the single arm 2 from impacts and dust without preventing movement thereof.

The rest of the description of the device according to the invention will be described in the light of all the FIGS. 4b to 7, being careful to describe the most significant elements.

These figures show a rotating plate 14, which is mounted rotatably on the base 5 and on which the single telescopic arm 2 articulates in the following fashion: the first end (the bottom end here) of the single telescopic arm 2 comprises an articulation fork 15 articulated on a trunnion 16 of the rotating plate 14. This mounting by fork affords better distribution of the forces exerted by the single arm 2 on the plate 14.

Each of the branches of the articulation fork 15 is provide with an orifice coinciding, in the mounting position, with an orifice provided in the trunnion 16, in order to mount the fork on the trunnion by through fixing means. On the one hand, these are conventional fixing means, for example by bolting 17. However, one of the fixing means, on the other hand, comprises a rod 18 on which the second sensor c2 is mounted, serving to determine the rotation angle $\theta$ of the rocking telescopic arm, the rod 18 thus fulfilling two functions at the same time, namely mounting the single telescopic arm 2 on the trunnion 16 and serving as a reference for the sensor c2 so that it can measure the rotation amplitude of the single arm 2 about the axis X.

The plate 14 is mounted so as to rotate on the base 5 by a ball bearing system centred on the first axis Z, as shown in more detail in FIG. 7. This ball bearing system comprises a central swivel 19 centred on the first axis Z, which is mechanically coupled to the base 5 and covered by a ball-bearing raceway 20 itself coupled mechanically to the rotating plate 14. The plate 14 accepts the ball bearing (mounted clamped on the plate 14). The function of the raceway 20 is to hold the plate 14 in abutment on the balls 23 (FIG. 5), thus ensuring, coupled to the ball bearing, perfect rotation about the axis Z. The detail of the ball bearing, known per se, is not entered into here.

This central swivel 19 comprises a central rod 21 passing through the ball bearing raceway 20, a rod on which the first sensor c1 serving to determine the rotation angle $\Phi$ of the plate 14 about the axis Z is mounted.

An optional auxiliary ball bearing system is also provided, ensuring that a constant distance is maintained between the base 5 and the rotating plate 14 and therefore perfect parallelism. This system, visible in FIGS. 5 and 7, comprises a ring 22 pierced with orifices, which cooperates with a groove 24 present on the face of the base 5 turned towards the rotating plate 5 by a set of balls 23 disposed between ring and groove. The balls 23 are positioned by the orifices of the ring and are held in position by suitable clamping. This auxiliary means prevents any warping of the plate 14 with respect to the base 5, and guarantees the fixing, here the verticality, of the axis Z.

The third sensor c3 is mounted in the vicinity of the first end, here the bottom end, of the single telescopic arm 2. It is intended to measure the extension $\rho$ of the arm, and comprises a drum on which a ribbon is coiled, the other end of which is fixed close to the second end of the telescopic arm, and in which a return spring (elements not detailed here) is mounted. The sensor c3 is arranged so that the ribbon rotates the drum when the single telescopic arm 2 is deployed while unwinding, causing the compression of the spring, and in that the ribbon rewinds on the drum by relaxation of the said spring when the arm folds.

In the operating mode, the measuring device is associated with a computer, not shown, able to collect and process the measurements determined by the sensors c1, c2 and c3. This is for example a portable computer, connected to the sensors of the device by cabled means, or more conveniently by wireless communication means (of the Bluetooth type in particular).

The measurement is made in the following fashion, as shown in FIG. 3: once the device is fixed and referenced on the support 6, the operator positions the measuring device 1 on one of the bars 10 or 10', and informs the computer of the position of the device 1 on this bar 10 or 10'. The operator moves the head of the feeler 3 close to the point on the body to be checked by extending the single telescopic arm 2. The operator then adjusts the positioning of the head 3 on the reference point of the body of a vehicle, choosing, prior to any measurement, the position of the head 3 with respect to the single arm 2 that is the most appropriate, pivoting the head 3 to the required position with respect to the axis X' or X". He informs the computer of the chosen position of the head 3 from a number of possible positions indexed with respect to the single arm 2, so that the computer takes this data into consideration, then he manually triggers the measurement simultaneously by the three sensors c1, c2 and c3. The manual triggering means may be implemented, in a known manner, by a button (not shown) on the device itself, in particular at the single arm 2 or the cover 4, or by control at the calculator/computer, or by means of a remote control. The calculator, here the computer, collects the data measured and makes the appropriate calculations in order to determine the spatial coordinates of the point in question. Once the calculations have ended, its screen displays the results, which are compared either by the computer itself or by the operator, by means of reference tables.

In conclusion, the invention has therefore proposed a novel type of three-dimensional measuring device that is more compact than and as reliable as the known devices of the known prior solutions. In addition, its system of holding and referencing with respect to its support, also commonly referred to as the inspection bench or bed, in the context of the repair of vehicles, avoids having to separately carry out a measurement of the attitude of the vehicle to be checked.

The invention also relates to the use of the device as previously described for checking deformations on components of a damaged vehicle.

The invention is not limited to the embodiment that has just been described: it also encompasses any variant repeating, with equivalent means, the features stated above.

The invention claimed is:

1. A three-dimensional measuring device, characterised in that it comprises:
   a base intended to be fixed to a support assembly and lying in a first plane,
   a plate mounted so as to rotate on the base about a first axis orthogonal to the first plane, said plate being equipped with a first sensor determining the angle of rotation of the plate about the first axis,
   a single rocking telescopic arm, a first end of which is articulated on the plate about a second axis orthogonal to the first axis so as to be able to rock in a second plane containing the first axis and orthogonal to the second axis, the angle of rotation of said single arm about the second axis being determined by a second sensor, the second end of the single telescopic arm being provided with a measuring feeler, and the said single arm being equipped with a third sensor determining the elongation length of the arm in translation,
   the spatial position of the measuring feeler being determined by its polar coordinates in the fixed three-dimensional reference frame consisting of the base once the latter is fixed to the support assembly.

2. A device according to the preceding claim, wherein the first end of the single telescopic arm comprises an articulation fork articulated with respect to a trunnion on the rotating plate.

3. A device according to claim 2, wherein each of the arms of the articulation fork is provided with an orifice coinciding in the mounting position with an orifice provided in the trunnion on the rotating plate, in order to mount the fork on the trunnion by through fixing means.

4. A device according to claim 3, wherein one of the fixing means comprises a rod on which the second sensor is mounted so as to determine the rotation angle of the single rocking telescopic arm.

5. A device according to claim 4, wherein the plate is mounted so as to rotate on the base by means of a ball bearing system centred on the first axis.

6. A device according to claim 5, wherein the ball bearing system comprises a central swivel centred on the first axis, which is mechanically coupled to the base and covered by a ball-bearing raceway itself mechanically coupled to the rotating plate.

7. A device according to claim 6, wherein the central swivel comprises a central rod passing through the ball-bearing raceway, a rod on which the first sensor is mounted so as to determine the rotation angle of the plate about the first axis.

8. A device according to claim 5, wherein it comprises an auxiliary ball bearing system ensuring the maintenance of a constant distance between the base and the rotating plate.

9. A device according to claim 1, wherein the third sensor is mounted in the vicinity of the first end of the telescopic arm.

10. A device according to claim 9, wherein the third sensor comprises a drum on which a ribbon is coiled, the other end of which is fixed close to the second end of the telescopic arm, and in which a return spring is mounted.

11. A device according to claim 1, wherein the plate is provided with a protective cover comprising a diametral slot allowing the rocking movement of the single telescopic arm.

12. A device according to claim 1, wherein the measuring feeler comprises a head, in particular spherical, mounted in an articulated fashion, in particular on one or two axes, with respect to the single telescopic arm.

13. A device according to claim 1, wherein it is associated with a computer able to collect and process the measurements determined by the sensors.

14. A device according to claim 1, wherein the base (5) is provided with means of centring vis-à-vis the support assembly (6) comprising centring pins (11) able to cooperate with orifices (9') provided on the support assembly.

15. A device according to claim 1, wherein the base is provided with means of holding on the support assembly comprising magnets able to cooperate with a metal bar provided on the support assembly.

16. A device according to claim 1, wherein it comprises a means of manual triggering of a simultaneous measurement by the first, second and third sensors.

17. A device according to claim 1, wherein it is associated with a support assembly by centring means and holding means cooperating between the said device and the said support assembly in order to ensure the referencing and holding of the base of the device on its support assembly for each possible positioning of the base on the support assembly.

\* \* \* \* \*